United States Patent [19]
Proctor et al.

[11] Patent Number: 5,655,002
[45] Date of Patent: Aug. 5, 1997

[54] RADIO TELEPHONE SYSTEM WITH SIGNAL STRENGTH ASSESSMENT

[75] Inventors: Peter N. Proctor, Basingstoke; Peter I. Love, Holywell, both of United Kingdom

[73] Assignee: Orbitel Mobile Communications Limited, Newbury, United Kingdom

[21] Appl. No.: 415,191

[22] Filed: Apr. 3, 1995

Related U.S. Application Data

[63] Continuation-in-part of Ser. No. 90,713, Jul. 13, 1993, abandoned.

[51] Int. Cl.$^6$ .......................... H04M 11/00; H04B 1/00; H04B 17/00
[52] U.S. Cl. .............. 455/450; 455/67.1; 455/226.2; 455/513
[58] Field of Search .................... 379/58, 59, 61, 379/62, 63, 60; 455/34.1, 33.1, 54.2, 34.2, 54.1, 67.1, 67.3, 226.2, 56.1

[56] References Cited

U.S. PATENT DOCUMENTS

| | | | |
|---|---|---|---|
| 5,203,012 | 4/1993 | Patsiokas et al. | 455/34.1 |
| 5,345,596 | 9/1994 | Buchenhorner et al. | 455/33.1 |
| 5,384,828 | 1/1995 | Brown et al. | 379/61 |
| 5,396,648 | 3/1995 | Patsiokas et al. | 455/54.2 |

*Primary Examiner*—Curtis Kuntz
*Assistant Examiner*—Binh K. Tieu
*Attorney, Agent, or Firm*—Leydig, Voit & Mayer, Ltd.

[57] ABSTRACT

A telecommunication system includes a number of radio base stations connected to a telephone network, the base stations forming a link to the network for a number of cordless telephones. Each base station determines in which of a number of predetermined signal strength bands the signal strength of a signal produced by a cordless telephone and received by the base station lies. If the received signal strength lies in a lower band, the base station stores an indication of the signal, and scans through the communication channels available between the base station and the cordless telephones to determine whether a new incoming signal lies in the highest signal band, or whether by increasing the rank of the band of a stored signal, the highest signal band is reached.

12 Claims, 3 Drawing Sheets

RADIO TELEPHONE SYSTEM WITH SIGNAL STRENGTH ASSESSMENT

CROSS-REFERENCE TO RELATED APPLICATION

This is a continuation-in-part application of U.S. patent application Ser. No. 08/090,713, filed Jul. 13, 1993 now abandoned.

FIELD OF THE INVENTION

This invention relates to a telecommunication system and has particular, although not exclusive, relevance to telecommunication systems including cordless telephones.

DESCRIPTION OF THE RELATED ART

The so-called CT2 cordless telephone system is a system wherein possessors of suitable telephone handsets can register their handsets with one or more services, the memory of the handset then being encoded with data including the appropriate identification code (LID) for that service. Such registered handsets can then be used to make outgoing calls through suitably located radio base stations to a telephone network, public access versions of these base stations generally being located in public places, for example railway stations. Such a telecommunication system is hereinafter described as "a telecommunication system of the type specified".

When the user uses the handset to request that a call be made, the handset transmits a signal, the LINK REQUEST signal, including data fields incorporating an identity number (PID) identifying the particular handset, together with the LID of the service. At some locations, such as railway stations, an operator may install more than one radio base station in order to provide sufficient carrier capability. In the CT2 system all base stations belonging to a given operator will respond to all received signals from handsets transmitting the appropriate LID for that service. This creates difficulties, however, where there are two or more base stations having overlapping coverage. When such base stations detect a LINK REQUEST signal from a handset, it is entirely random which base station will respond to the LINK REQUEST signal. Thus, the base station receiving the weakest signal may respond, this resulting in a poor quality signal telephone link for the user which could have been improved if a base station receiving a stronger signal from the handset had responded to the LINK REQUEST signal.

In U.K. published Patent Specification GB-2241134A there is described a telecommunication system of the type specified, in which each base station compares the received signal strength (RSSI) from a handset with a predetermined stored threshold signal level before setting up a link. If the RSSI is above the predetermined signal level, the base station immediately attempts to set up a link. If, however, the RSSI is below the threshold level, the identity of the handset is stored and the base station will only set up a link if it receives a subsequent request from the same handset.

SUMMARY OF THE INVENTION

It is an object of the present invention to provide a telecommunication system of the type specified in which the above problem of base stations having overlapping coverage is at least alleviated, the system having greater sensitivity than known telecommunication systems.

According to a first aspect of the present invention there is provided a telecommunication system including at least two base stations for communication with a telephone network, and a plurality of portable telecommunication apparatus arranged to communicate with the base stations through a plurality of communication channels, each base station having means for determining which in a plurality of signal strength bands the signal strength of a signal produced by a portable telecommunication apparatus and received by the base station lies, means for linking the portable telecommunication apparatus to the telephone network if the strength of the received signal lies within the strongest signal strength band, and otherwise recording an indication of the received signal in a pending received signal list, means for scanning through the communication channels for new signals from other of the portable telecommunication apparatus and recorded signals on the list, and means for periodically increasing the band rank in which the recorded signals lie until they reach the highest signal strength band and then linking the originating telecommunication apparatus to the telephone network.

According to a second aspect of the present invention, there is provided a base station for communication with a telephone network and with a plurality of portable telecommunication apparatus through a corresponding plurality of communication channels, the base station having means for determining which within a plurality of signal strength bands the signal strength of a signal produced by the portable telecommunication apparatus and received by the base station lies, means for linking the portable telecommunication apparatus to the telephone network if the strength of the received signal lies within the strongest signal strength band, or otherwise recording an indication of the received signal in a pending received signal list, means for scanning through the communication channels for new signals from the portable telecommunication apparatus and recorded signals in the pending received signal list, and means for periodically increasing the band rank in which the recorded signals lie until they reach the highest signal band and then linking the originating telecommunication apparatus to the telephone network.

BRIEF DESCRIPTION OF THE DRAWINGS

One telecommunication system, together with a base station for use in the system, embodying the invention will now be described, by way of example only, with reference to the accompanying drawings in which.

DETAILED DESCRIPTION OF THE INVENTION

Figure 1:
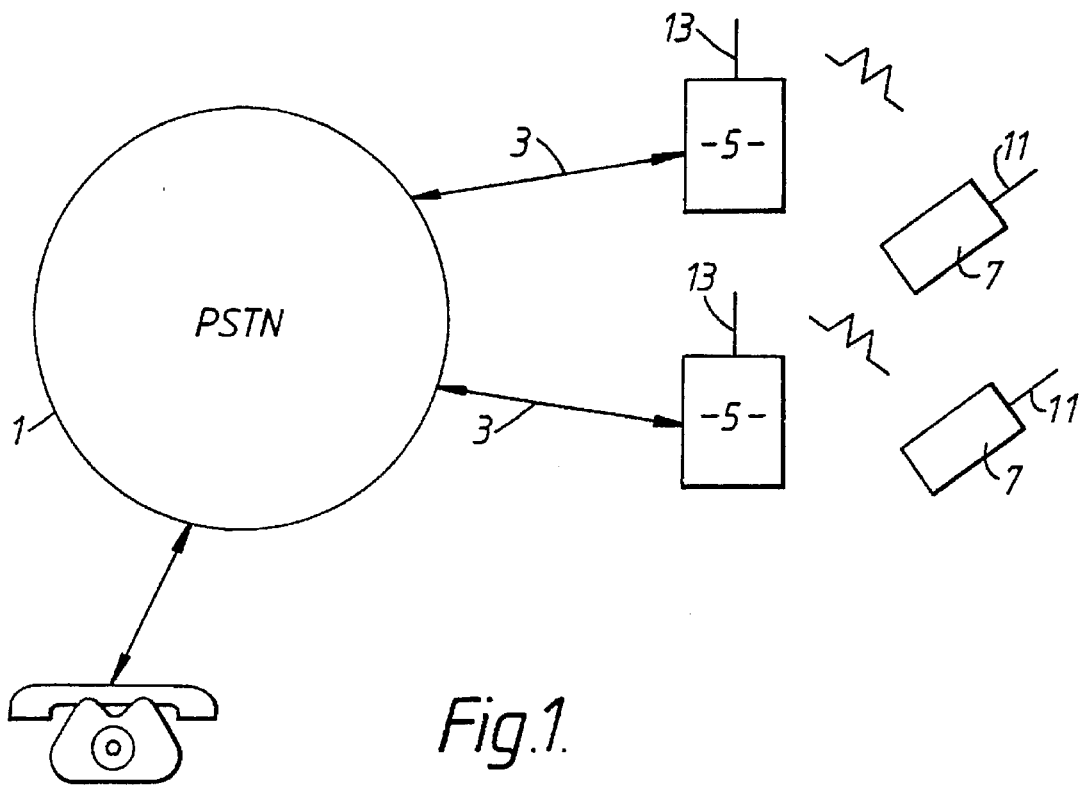
FIG. 1 is a schematic diagram of the telecommunication system.

Referring firstly to FIG. 1, the telecommunication system includes a central switching network 1, this being typically a public switched telephone network (PSTN), although in the future the network 1 may also be an integrated services digital network (ISDN). The network 1 is connected by suitable cabling 3, which may be either hard wire or optical fibre, or by an rf link, to a number of base stations 5 located at, for example, railway stations or other public places. Only two such base stations 5 are shown in FIG. 1 for the sake of clarity, although it will be appreciated that a greater number of such base stations will normally be connected to any given network 1. Each base station 5 is intended to service a large number of portable handsets 7 carried by users of the system, only two such handsets being shown in FIG. 1. The system is designed to be in accordance with the European Telecommunications Standards Institute Interim Standard I-ETS 300 131, incorporated herein by reference, to which reference may be had for further details and regulatory restrictions of the system.

Figure 2:
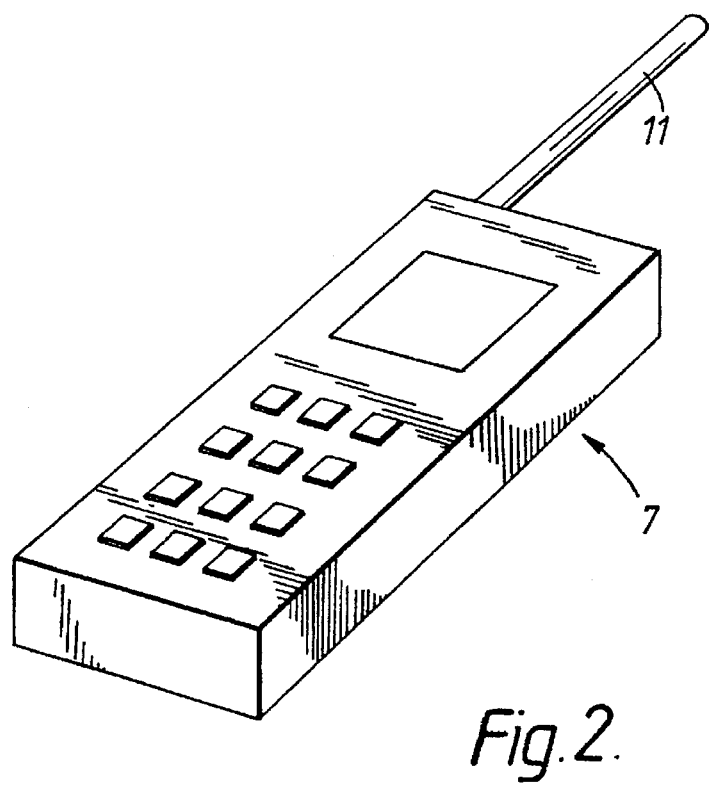
FIG. 2 illustrates schematically a handset used in the system of FIG. 1 to an enlarged scale and in more detail.

Referring now also to FIG. 2, each handset 7 includes a memory (not shown) in which is programmed the portable identification number (PID), constituted by 27 bits, this number uniquely identifying the handset. The memory is also programmed with at least one 16 bit quantity, the LID, each ID identifying a service with which the user of the handset is registered.

In order to make a call, the user enters the required remote telephone number on the keypad of the handset 7 and requests the call to be established. This causes the antenna 11 of the handset 7 to transmit an rf signal which will be detected by the antennas 13 of all the base stations 5 within the range of the handset 7. The signal transmitted by the antenna 11 is the so-called LINK REQUEST signal including the PID and LID. The LINK REQUEST signal is sent out from the handset 7 in a burst mode transmission mode known as MUX 3. Further details of this signal configuration is described in European Patent Published Specification No. 0411083 (Application No. 90902643.7). In this mode, each handset 7 transmits continuously for 10 ms and then receives continuously for 4 ms. This cycle repeats for at least some 750 ms, after which time the handset 7 may try transmitting on a different channel, or until a base station 5 responds, or until the expiry of a time limit set by a timer (not shown) in the handset 7 at 5 seconds, whichever occurs sooner, all as will be described in more detail hereafter. On expiry of the time limit of 5 seconds, the handset link set-up attempt will be regarded as failed and the user must redial. When each base station 5 within the range of the handset 7 detects the LINK REQUEST signal, it will process this signal to determine from the LID whether the handset 7 is registered with the service serviced by that base station 5.

Figure 3:
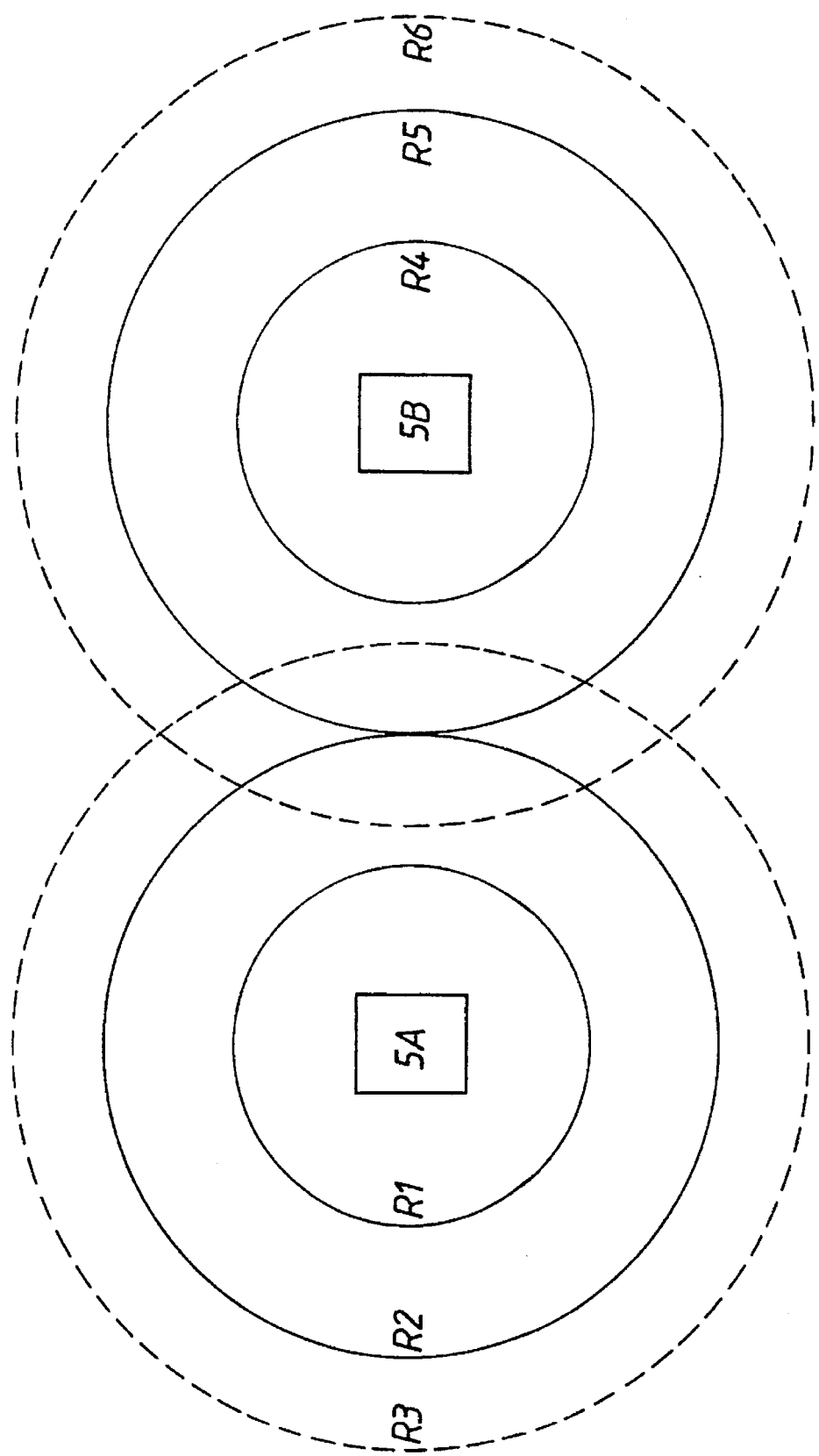
FIG. 3 is a schematic diagram indicating the range of each base station incorporated in the system shown in FIG. 1.

As shown in FIG. 3, in some locations such as railway stations it is likely that the base stations 5 will have overlapping range. Thus, in the example shown in FIG. 3, base station 5A will have the overall signal range R1+R2+R3, whilst base station 5B will have the range R4+R5+R6, where:

R1 and R4 are the annular regions of RSSI lying within a first band for base stations 5A and 5B respectively;

R2 and R5 are the annular regions of RSSI lying within a second band for base stations 5A and 5B respectively, these signal strengths being less than a first threshold signal strength for the two base stations 5A,5B; and R3 and R6 are annular regions corresponding to the fade regions for base stations 5A and 5B respectively, for RSSI of greater than the sensitivity threshold for the two base stations 5A,5B, but where good quality communication with each base station may not necessarily be maintained from a handset.

It will be appreciated that, in general, the ranges R1,R2, R3,R4,R5,R6 will be terms of signal strength, not distance. Thus the nearest or furthest base station to any particular handset 7 will not necessarily be in terms of geographical distance, but in terms of "rf distance". A base station that is geographically close to a handset may, therefore, measure a RSSI which is lower than that of a base station which is more distant from the handset if there are more obstacles between the hand set and the closer base station than between the handset and the more distant base station.

Figure 4:
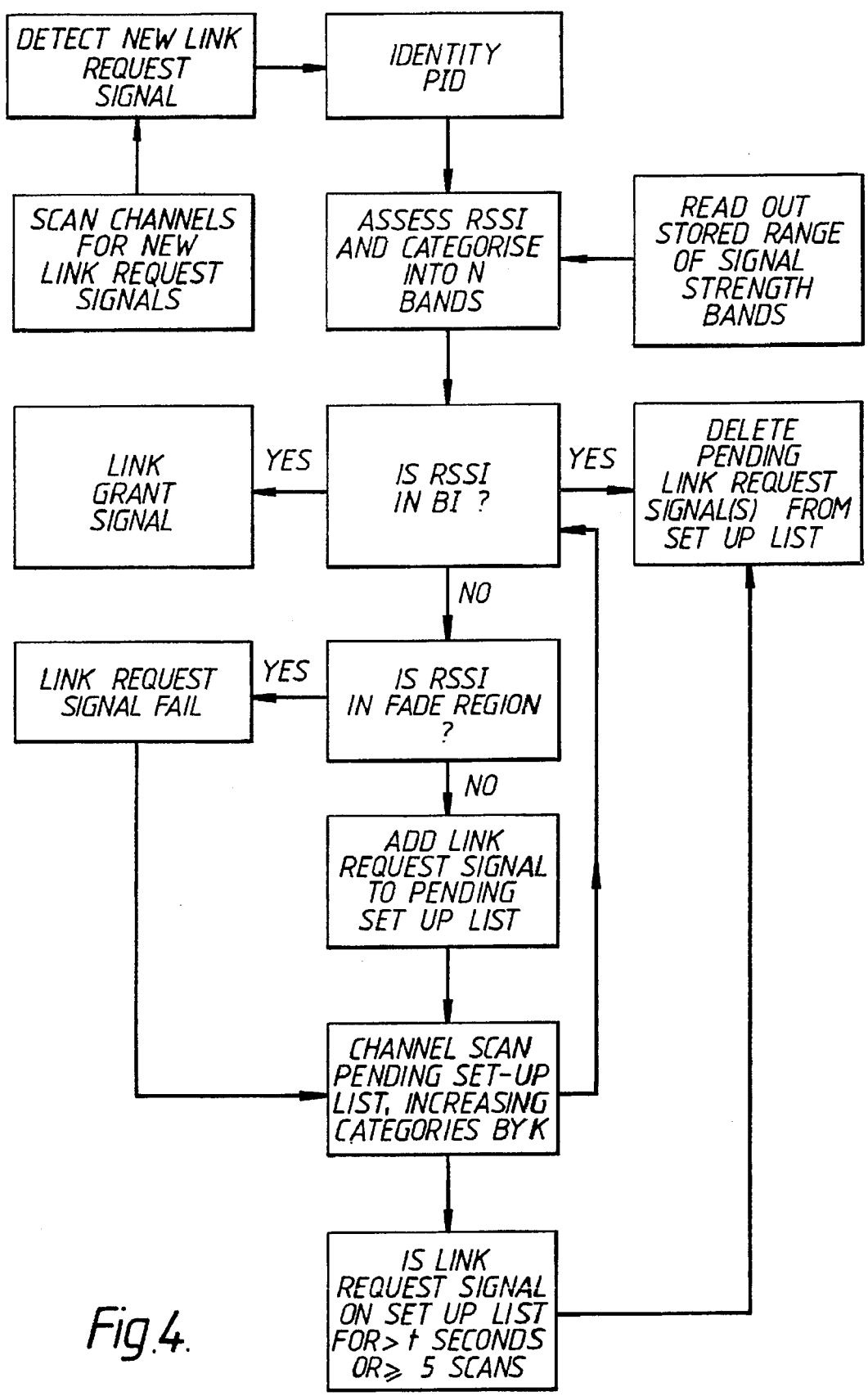
FIG. 4 is a flow chart illustrating the operation of each base station incorporated in the system of FIG. 1.

In use of the system, when a handset 7 transmits a LINK REQUEST signal, all base stations 5 which detect the signal will follow the procedure set out in the flow diagram shown in FIG. 4.

Thus, on receipt of a LINK REQUEST signal, each base station 5 within the range of the signal will assess the signal's RSSI. Each base station will also note the handset identity by means of the PID within the signal.

The base station 5 will then categorize the RSSI into one of N-bands, where N=2 in the example described. If the signal is categorized into band B1 corresponding to the ranges R1 and R4 in FIG. 3, that is the highest signal strength band, then the base station 5 will respond immediately to the LINK REQUEST signal and transmit a LINK GRANT signal to the handset 7, this containing the handset PID and also a random number in the LID field, known as the link reference. The base station 5 then continues with the CT2 link set-up protocol agreed by the Common Air Interface (CAI) Executive, waiting for a confirmatory handshake response from the handset 7. On receiving a handshake response from the correct handset 7, the link is established. The base station will then establish the link between the handset 7 and the central switching network 1 to enable the user of the handset 7 to communicate through the central switching network 1 to a remote telephone, for example as shown in FIG. 1.

If the RSSI is in the fade margin region, corresponding to the ranges R3 and R6 in FIG. 3, the base station will ignore the LINK REQUEST signal. This prevents the base station attempting to set up calls on the basis of very weak signal strengths. Thus a user does not get the impression of poor quality signal links for the system.

If the RSSI is categorized into an intermediate band, i.e. B2 corresponding to the ranges R2 and R5 in FIG. 3 in the particular example illustrated in FIG. 3, then the base station 5 will add the handset 7 identified by the PID to a list of pending set-ups within the base station's memory, that is, a list of pending calls for which the base station has not yet set up a link. This list is referred to below as the PSU List. It can store up to a maximum predetermined number of pending set-ups preprogrammed in the base station 5. Thus, in its PSU List the base station will store the PID of the handset 7 together with an indication that its RSSI is of rank B2 (in this example). This storage process provides an effective time delay which gives a second base station 5 the opportunity to respond to the handset 7 if the second base station 5 receives a higher strength LINK REQUEST signal from the handset 7. If, however, the original base station 5 then sees a LINK REQUEST signal for which the signal categorization is in the highest signal band B1, then the base station 5 will respond immediately, deleting all pending set-ups in the PSU List.

As the base station 5 continues to scan channels, further LINK REQUEST signals of RSSI greater than the lower threshold limit may be picked up from other handsets 7. If such a LINK REQUEST signal is received from a handset 7 already in the base station's PSU List, then the existing signal categorization of that handset in the PSU List is arranged to be changed to a new level of categorization according to the appropriate one of the following two possible procedures:

(A) If the newly measured RSSI for the particular handset 7 is equal to or weaker than the presently stored signal categorization, the presently stored signal categorization is increased in rank in the PSU List by 1 and produces the new level of categorization accordingly.

(B) If the newly measured RSSI for the particular handset represents a stronger signal than the presently stored signal categorization, the new level of categorization is obtained by assessing the level of categorization of the newly measured RSSI and raising the assessed level by K levels of categorization where K is the difference between the weakest possible level of categorization and the presently stored level. The resulting signal level is the new level of categorization.

If the new level of categorization (after (A) or (B) as appropriate) raises the categorization of the signal into the highest rank signal band B1, the base station 5 will transmit a LINK GRANT signal to the handset 7 and set up the call through the network 1, deleting all entries in the pending PSU List. If, on the other hand, none of the stored LINK REQUEST signals have reached the highest level signal, the base station 5 will continue to scan through the channels.

By way of explanation, some examples will be considered. For the purposes of these Examples, it will be assumed that there are 6 different categorization bands B1 to B6 for the RSSI (that is, N=6 in this case), B1 being the band corresponding to the highest RSSI values.

EXAMPLE 1

It will be assumed that the measured RSSI from a particular handset 7 is such that the RSSI falls in band B3. Since this is not the highest band, the base station does not set up the requested link but makes an entry in its PSU List, identifying the particular handset and annotating it as lying in band B3.

If the same handset now makes another LINK REQUEST and its measured RSSI is weaker than previously, say in band B4, the relevant entry in the PSU List is changed, in accordance with procedure (A) above, from B3 to B2. Again, since this is not the highest band (B1), the base station does not set up the link but updates the entry in the PSU List to record the new band, B2.

If the same handset now makes a further LINK REQUEST and its measured RSSI is the same as before (band B4), the relevant entry in the PSU List is again changed in accordance with procedure (A) above, from B2 to B1. B1 is the highest band and the LINK REQUEST is therefore granted. All entries in the PSU List are deleted.

EXAMPLE 2

This Example re-considers the PSU List referred to above in Example 1. It will be assumed that the PSU List contains the entry B2 against the handset referred to in the Example.

Example 1 then considered the case where the same handset made a further LINK REQUEST with the same measured RSSI as before. Example 2 considers the case where the handset instead makes a LINK REQUEST with a stronger RSSI—an RSSI in band B1. This is the highest band and the base station immediately grants the request and clears all entries from the PSU List.

EXAMPLE 3

This example considers Example 1 again, but this time considers the initial condition where the handset makes a LINK REQUEST with an RSSI in band B3. An appropriate entry is thus made in the PSU List.

It will now be assumed that the same handset makes another LINK REQUEST, this time a stronger request with an RSSI in band B2.

In accordance with procedure (B) above, the stored band in the PSU List is first assessed as B2 (that is, the level of the RSSI of the new LINK REQUEST). This assessed level is then raised by K where K is the difference between the weakest possible level of categorization (B6) and the currently stored level (B3). The newly assessed level B2 will therefore be raised by (theoretically) three levels of categorization—in practice it can only be raised to B1, the highest level, whereupon the base station immediately grants the request and clears all entries from the PSU List.

In the embodiment being considered, there are of course only two possible levels of categorization which can be stored (B1 and B2), which simplifies the operation of the algorithm.

The base stations 5 also include a mechanism for deleting pending LINK REQUEST signals in the PSU List after a certain time. This will generally be within the 5 second timer limit of the handsets 7 previously mentioned. Alternatively, deletion of a pending LINK REQUEST signal may take place after the pending signal has been scanned a predetermined number of times.

Each handset 7 will also include a timer effective to set a predetermined time limit after which the handset 7 is free to stop transmitting and to choose a new channel on which to repeat the procedure. This is typically set at 750 ms.

It is found that it is possible for a base station 5 to scan through all the available channels within one handset transmit cycle of 750 ms, even in the most dense traffic situation. The channel number on which the base station 5 sees a LINK REQUEST message is not relevant. Since a handset will transmit for 750 ms on one channel prior to trying another channel, it depends on how late in a 750 ms cycle a LINK REQUEST signal is detected by the base station, and thus how long the base station response is delayed. Thus, there is no need for the base station 7 to store the channel on which a LINK REQUEST signal is detected by the base station.

In the particular example described above by way of example, the base stations 5 only check the LID within the LINK REQUEST signals. In some systems, however, the base stations may check both the LID and PID.

It will also be appreciated that implementation of the system, described above, for allocating base stations 5 to outgoing calls from the handset 7, is achieved by the software in the base stations. Only this software needs amendment in order to implement the system described. Thus no change to the handset 7 is required. Such a modification to the software in the base stations will be applicable to all forms of base stations used in the CT2 cordless telephone system. Account must, however, be taken of the differing rf systems involved and any passive or other combiners used in the base stations 5. The time taken to scan through the channels leading to the link set-up response time will not be significantly affected from the perspective of the user. The user will, however, get a better impression of the system due to the optimum signal strengths link-up being chosen.

It will also be seen that the implementation of the above system will have a low processing overhead and can be realistically implemented in a small amount of code on an 8 bit microcontroller.

We claim:

1. A telecommunications system, comprising at least two base stations for communications with a telephone network; and a plurality of individually identified portable telecommunication units arranged to communicate with the base station through a plurality of communication channels by means of signals of measurable signal strength transmitted on those channels, each base station comprising:

storage means for storing a range of signal strength bands, the bands respectively corresponding to different predetermined signal strengths and being ranked within a range extending from a weakest signal strength band to a strongest signal strength band, the bands having respective identities indicating their corresponding signal strengths;

measuring means for measuring the signal strength of said signal received by a said base station from one of the portable telecommunication units;

determining means for determining the said identity of the signal strength band in which the measured signal strength lies;

linking means for linking that portable telecommunication unit to the telephone network if the measured signal strength lies within the strongest signal strength band, and otherwise recording the identity of the signal strength band and the identity of the portable telecommunication unit in a pending received signal list;

the measuring means being operative to measure the signal strengths of signals received subsequently by the base station from particular ones of the portable telecommunication units;

means for scanning through the communication channels for new signals from the portable telecommunication units and through recorded signals on the list;

adjusting means operative each time a signal is received by the base station from one of the portable telecommunication units whose identity is stored in the list to increase the rank within the said range of the signal strength band recorded in the list for that portable telecommunication unit, the adjusting means comprising comparing means responsive to the measured strength of the received signal to compare that strength with the strength of the band recorded in the list for that portable telecommunication unit and operative to increase the rank of that band in the range by an amount dependent on that comparison, the comparing means of the adjusting means including first means operative to detect a signal received from said one portable telecommunications unit and which has a weaker signal strength than the strength of the band recorded in the list for that portable telecommunications unit and responsive to such signal to increase the rank of that band in the said range to the next higher strength band, and second means operative to detect such a signal received from said one portable telecommunication unit and which has a stronger signal strength than the strength of the band recorded in the list for that portable telecommunication unit and responsive to such signal to increase the rank of that band in the said range by a number of bands in the said range which is dependent on the difference in number of bands between the weakest signal strength band and the currently recorded signal strength band in the said list; and means operative when the rank of the signal strength band of that portable unit has been increased to the strongest signal strength band to link that portable telecommunication unit to the telephone network.

2. A telecommunication system according to claim 1, in which the base station includes means for disregarding received signals of less signal strength than said weakest signal strength band.

3. A telecommunication system according to claim 1, in which the allocation of base stations to signals received by the portable telecommunications units is implemented by software incorporated in the base stations.

4. A telecommunication system according to claim 1, in which the base stations include means for deleting all recorded identities of signal strength bands and of said portable telecommunication units on the pending list when setting up a link between a portable telecommunication unit and the telephone network.

5. A telecommunication system according to claim 1, in which each said base station includes means for scanning through the pending received signal list a predetermined number of times before deleting the list.

6. A telecommunication system according to claim 1, in which each said base station includes means for deleting all recorded identities of signal strength bands and of said portable telecommunication units from the pending received signal list after a predetermined time.

7. A base station for communicating with a telephone network and with a plurality of portable telecommunication units through a corresponding plurality of communication channels by means of signals of measurable signal strength transmitted on those channels, the base station comprising:

storage means for storing a range of signal strength bands, the bands respectively corresponding to different predetermined signal strengths and being ranked within a range extending from a weakest signal strength band to a strongest signal strength band, the bands having respective identities indicating their corresponding signal strengths;

measuring means for measuring the signal strength of a signal received by the base station from one of the portable telecommunication units;

determining means for determining the said identity of the signal strength band in which the measured signal strength lies;

linking means for linking that portable telecommunication unit to the telephone network if the measured signal strength lies within the strongest signal strength band, and otherwise recording the identity of the signal strength band and the identity of the portable telecommunication unit in a pending receiving signal list;

the measuring means being operative to measure the signal strengths of signals received subsequently by the base station from particular ones of the portable telecommunication units;

means for scanning through the communication channels for new signals from the portable telecommunication units and through recorded signals in the pending received signal list;

adjusting means operative each time a signal is received by the base station from one of the portable telecommunications units whose identity is stored in the list to increase the rank within the said range of the signal strength band recorded in the list for that portable telecommunication unit, the adjusting means comprising comparing means responsive to the measured strength of the received signal to compare that strength with the strength of the band recorded in the list for that portable telecommunication unit and operative to increase the rank of that band in the range by an amount dependent on that comparison, the comparing means of the adjusting means including first means operative to detect such a signal received from said one portable telecommunications unit and which has a weaker signal strength than the strength of the band recorded in the list for that portable telecommunications unit and responsive to such signal to increase the rank of that band in the said range to the next higher strength band, and second means operative to detect such a signal received from said one portable telecommunication unit and which has a stronger signal strength than the strength of the band recorded in the list for that portable telecommunication unit and responsive to such signal to increase the rank of that band in the said range by a number of bands in the said range which is dependent on the difference in number of bands between the weakest signal strength band and the currently recorded signal strength band in the said list; and means operative when the rank of the signal strength band of that portable unit has been increased to the strongest signal strength band to link that portable telecommunication unit to the telephone network.

8. A base station according to claim 7, including means for disregarding received signals of less signal strength than said weakest signal strength band.

9. A base station according to claim 7, in which its allocation to signals produced by said portable telecommunications units is implemented by software incorporated in the base station.

10. A base station according to claim 7, including means for deleting all recorded identities of signal strength bands and of said portable telecommunication units on the pending list when setting up a link between a said portable telecommunication unit and the telephone network.

11. A base station according to claim 7, including means for scanning through the pending received signal list a predetermined number of times before deleting the list.

12. A base station according to claim 7, including means for deleting all recorded identities of signal strength bands and of said portable telecommunication units from the pending received signal list after a predetermined time.

* * * * *